June 7, 1960
E. M. BOGAR, JR
2,939,733
FASTENING DEVICE FOR USE IN ASSEMBLING
ARTICLES OF FURNITURE
Filed Nov. 26, 1956
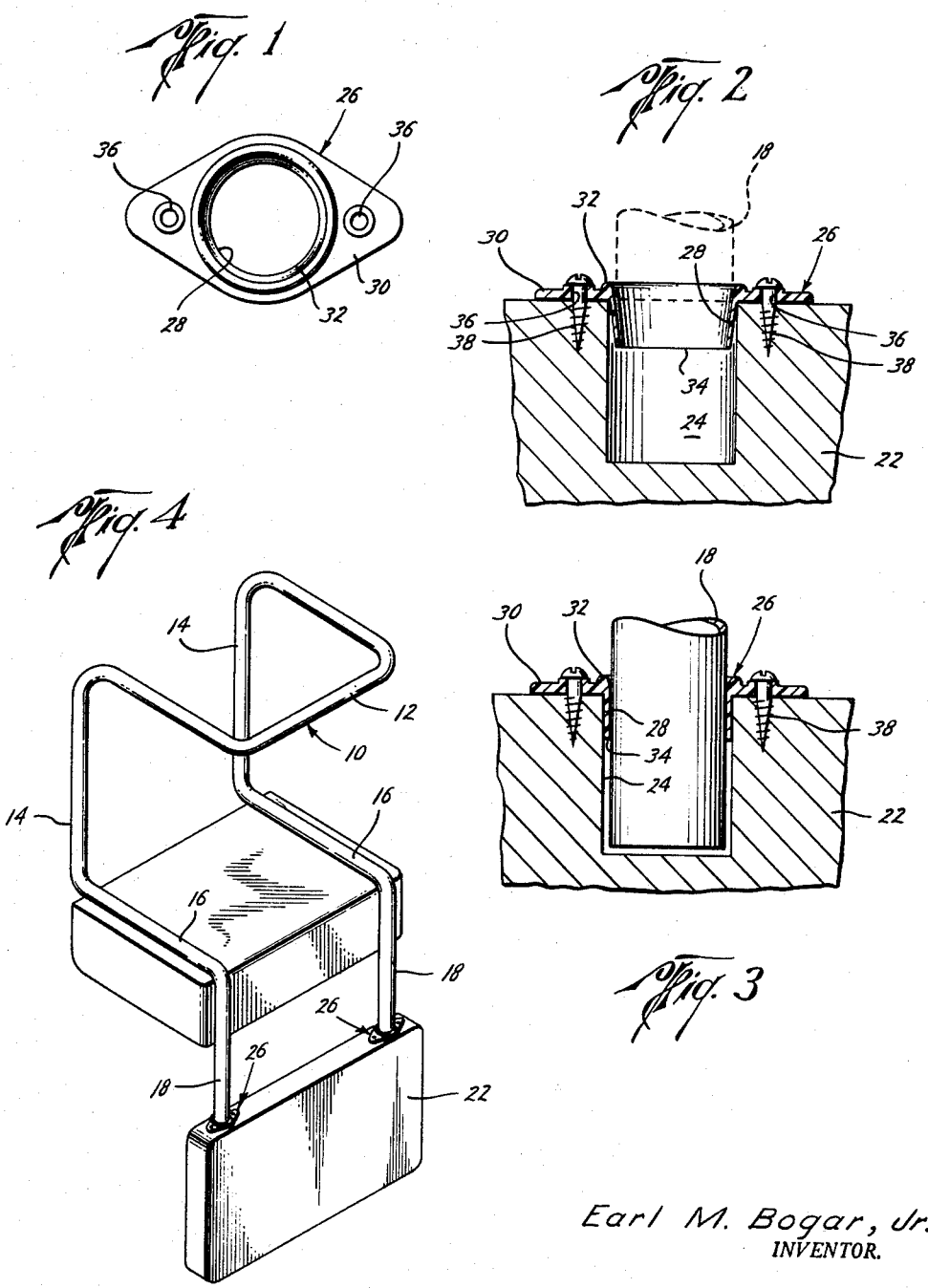
Earl M. Bogar, Jr.
INVENTOR.
BY
Charles E. Lightfoot
ATTORNEY

United States Patent Office 2,939,733
Patented June 7, 1960

2,939,733

FASTENING DEVICE FOR USE IN ASSEMBLING ARTICLES OF FURNITURE

Earl M. Bogar, Jr., 1201 Congress Ave., Houston, Tex.

Filed Nov. 26, 1956, Ser. No. 624,430

2 Claims. (Cl. 287—126)

This invention relates to a fastening device for use in assembling articles of furniture, and more particularly to a device for use with articles which may be assembled by inserting tubular or rod-like parts into holes formed in other parts.

In the production of furniture, and especially in the manufacture of chairs, a supporting frame of tubular or rod-like material is frequently employed to which certain parts, such as the back rests of chairs, are attached by inserting the ends of the tubing or rod into holes in such parts. Various means have been proposed heretofore whereby the frame elements and parts of structures of this kind could be secured together, such as metal clips or clamps adapted to be attached to the back rest by screws or the like and which grip the frame element when inserted in the hole to hold the element against removal therefrom. The use of fastening devices of this kind, as heretofore usually provided, is attended by the disadvantages that they are expensive in manufacture, troublesome and time consuming in application and likely to cause marring of the finish of the frame elements to which they are applied.

The present invention has for an important object the provision of a fastening device for assembling structures having tubular or rod-like elements and parts formed with holes into which such elements are inserted, and by the use of which the elements and parts may be quickly and easily assembled and are securely held together.

Another object of the invention is the provision of a fastening device of the type referred to which is formed of relatively soft material whereby marring or other damaging of the parts thereby is eliminated.

A further object of the invention is to provide a fastening device of the kind mentioned which is of one-piece molded construction and economical manufacture.

Another object of the invention is the provision of a fastening device for securing a tubular or rod-like element in a hole in a part when such element is inserted therein which device embodies a tapered tubular sleeve-like member adapted to fit into the hole and through which the element may be inserted to wedgingly engage the member with the element and part to securely hold the element and part together.

A further object of the invention is the provision of a fastening device of the type referred to embodying a tapered sleeve-like member formed of expansible material adapted to be inserted in a hole in a structural part and through which a tubular element is insertable to expand the member into gripping engagement with the element and with the part in the hole to hold the element and part connected together.

The above and other important objects and advantages of the invention may best be understood from the following detailed description, constituting a specification of the same, when considered in conjunction with the annexed drawings, wherein—

Figure 1 is an end elevational view of a fastening device embodying the invention;

Figure 2 is a longitudinal, central, cross-sectional view of a structural part illustrating the manner in which the invention is applied thereto and showing the device of the invention inserted in a hole in such part;

Figure 3 is a view similar to that of Figure 2 illustrating the manner in which the invention functions to secure a structural part and tubular element together, the element being shown inserted in the hole in the part and through the fastening device; and, Figure 4 is an inverted, perspective view of a chair having a tubular frame and illustrating the manner in which the device of the invention may be used to attach a back rest to the frame of such a chair.

Referring now to the drawings in greater detail the invention is illustrated herein in connection with its use as a means for securing a back rest to a chair having a tubular frame, it being understood that such illustrating is intended by way of example only, and that the invention can be used for connecting together the parts of structures of numerous different kinds wherein a tubular or rod-like element is to be attached to a part having a hole therein into which such element is insertable.

As shown in the drawings the chair is of usual design having a frame 10 formed of tubular or rod-like material, such as metal pipe, suitably bent to form a base or foot portion 12, leg portions 14, seat supporting portions 16 and upright back rest supporting elements 18. A seat 20 of suitable construction may be supported on the seat support portions 16 and secured thereto in any convenient manner, not shown.

The back rest, indicated at 22, may be of any desired or convenient construction, usually taking the form of a block or board of wood or other suitable material and of suitable thickness, having spaced apart holes or recesses, such as that indicated at 24, of any convenient depth, opening downwardly at the lower edge of the back rest and which are spaced apart a distance to permit the insertion of the upper ends of the support elements 18 therein.

The holes or recesses 24 are of a diameter somewhat greater than the external diameter of the tubular elements 18 for a purpose to be hereinafter more fully explained.

A fastening member, generally indicated at 26, is inserted in each of the holes 24, which member is formed of resilient material, such as plastic, rubber or the like, and is formed with a sleeve-like portion 28 which is initially tapered as seen in Figure 2. The sleeve-like portion 28 may be provided at one end with an external, laterally extending, end flange 30, formed with a bead 32 surrounding said one end, the sleeve-like portion tapering away from said flange toward the other end of the member. At its outer or flanged end the member 26 is of slightly larger internal diameter than the external diameter of the back rest supporting element 18 with which the member is to be used so that the element may be readily inserted into the member through the flange in the manner illustrated in Figure 2, the inner or smaller end 34 of the member being of somewhat smaller internal diameter than the external diameter of the element, whereby the sleeve-like portion 28 will be expanded by the element and wedged thereby into gripping engagement with the element and with the back rest in the hole 24, as seen in Figure 3, to securely connect the back rest to the support. For this purpose the thickness of the sleeve-like portion 28 is made such that the sleeve-like portion will be tightly wedged between the element 18 and the back rest in the hole 24 when the element is inserted through the member.

The flange 30 may be provided with one or more openings 36, through which suitable fastening means such as the screws 38 may be inserted to additionally secure the member 26 to the back rest.

For the purpose of simplicity and economy of manufacture, the external end flange 30 outwardly of the bead 32 may be omitted, the member 26 then being held in place solely by the wedging action of the element 18 whereby the element is expanded into gripping engagement with the back rest and element.

In attaching the back rest to the chair making use of the invention constructed as described above, the members 26 are inserted in the holes 24 in the manner shown in Figure 2, which holes may be larger in diameter than the elements 18 by an amount nearly equal to twice the thickness of the sleeve-like portion 28, and the elements 18 are forcibly inserted into the holes through the members, whereby the sleeve-like portions will be expanded and tightly wedged between the elements and the back rest to securely hold the back rest against removal.

It will thus be seen that the invention provides a fastening device of simple design and economical manufacture, which is easily and quickly applied and which is effective to securely connect the parts together without danger of marring the finish of the parts or otherwise damaging the same.

While the invention has been disclosed herein in connection with certain specific embodiments of the same, it will be understood that various changes can be made in the construction of the same as well as in the particular manner of its application within the spirit of the invention and the scope of the appended claims.

Having thus clearly shown and described the invention, what is claimed as new and desired to secure by Letters Patent is:

1. In an article of furniture the combination with two rigid parts one of which is provided with an elongated cylindrical bore and the other of which is of elongated cylindrical shape and of smaller external diameter than the diameter of said bore, of a fastening device for securing said parts together comprising an expansible sleeve-like member formed of resilient material having an elongated wall portion of uniform thickness adapted to be loosely inserted in said bore and having an outer end whose internal diameter is greater than the external diameter of said cylindrical part and an inner end whose external diameter is smaller than the diameter of said bore and whose internal diameter is smaller than the external diameter of said cylindrical part, said cylindrical part being insertable in the bore through said member to expand said wall portion into frictional engagement with the external surface of said cylindrical part and the internal surface of said one part in said bore to hold the parts against longitudinal and angular movement relative to each other.

2. In an article of furniture the combination with two rigid parts, one of which is provided with an elongated cylindrical bore and the other of which is of elongated cylindrical shape and of substantially smaller external diameter than the diameter of said bore, of a fastening device for securing the parts together comprising an expansible, sleeve-like member formed of resilient material having an elongated wall portion adapted to be loosely inserted in said bore and whose internal diameter is greater than the external diameter of said cylindrical part at the outer end of said wall portion and smaller than the external diameter of said cylindrical part at the inner end of said wall portion and said wall portion being of uniform thickness greater than one-half of the difference between the external diameter of said cylindrical part and the diameter of said bore, said cylindrical part being insertable into said bore through said member to expand said wall portion into frictional engagement with the external surface of said cylindrical part and the internal surface of said one part in said bore to hold the parts against longitudinal and angular movement relative to each other, and an external annular flange on the outer end of said member positioned for engagement with said one part exteriorly of said bore to limit the inward movement of the member in the bore.

References Cited in the file of this patent

UNITED STATES PATENTS

| | | |
|---|---|---|
| 661,519 | Hart et al. | Nov. 13, 1900 |
| 1,914,006 | Brown | June 13, 1933 |
| 2,290,678 | Dodge | July 21, 1942 |
| 2,311,427 | Winkelmeyer | Feb. 16, 1943 |
| 2,596,821 | Parkins | May 13, 1952 |
| 2,720,374 | Hutton | Oct. 11, 1955 |
| 2,740,650 | Hutton | Apr. 3, 1956 |
| 2,746,635 | Ammon | May 22, 1956 |
| 2,765,580 | Herrschaft | Oct. 9, 1956 |
| 2,772,034 | Richmond | Nov. 27, 1956 |